United States Patent

Ikeda

3,647,281
Mar. 7, 1972

[54] TELEPHOTOGRAPHIC OBJECTIVE HAVING SIX LENSES FORMING FOUR LENS GROUPS

[72] Inventor: Yoshitsugi Ikeda, Tokyo, Japan
[73] Assignee: Olympus Optical Co., Ltd., Shibuya-ku, Japan
[22] Filed: Aug. 3, 1970
[21] Appl. No.: 60,670

[30]  Foreign Application Priority Data

Aug. 27, 1969 Japan..................44/67825

[52] U.S. Cl. ........................................350/222
[51] Int. Cl. ........................................G02b 9/42
[58] Field of Search ....................350/221, 222, 255

[56]  References Cited

UNITED STATES PATENTS 2,810,322  10/1957  Tronnier..............................350/221 X
2,503,789  4/1950   Wood et al. ...........................350/255

*Primary Examiner*—John K. Corbin
*Attorney*—Kurt Kelman

[57]  ABSTRACT

Telephotographic objective of a wide angle of field consisting of six lens elements forming four lens groups separated from each other by airgaps, respectively. The foremost first lens group at the object side is a positive meniscus lens element, each of the second and the third lens group consisting of a composite negative lens group having a positive and a negative lens element cemented to each other with the negative lens element in each group facing to each other, the fourth lens group being a positive meniscus lens element. The concave surfaces of the first to three lens groups are directed to a diaphragm located between the second and third lens groups while the convex surface of the fourth lens group is directed to the diaphragm.

The lens satisfies the following relationships:

(I) $|0.7f_2| > f > -0.7f_3$ (II) $0.15f < d_5 < 0.35f$ (III) $(\nu_2 - \nu_3)/(\nu_4 - \nu_5) > 0.5$ $\nu_4 - \nu_5 > 20$ (IV) (a) $(n_3 - n_2)f/|r_4| < 0.05, n_3 > n_2$ (b) $0.15f < -r_7 < 0.5f$ (V) $r_{10} > 1.5 r_9 > 0.5f$ where:

$f$ = focal length of the entire system
$f_i$ ($i=1, 2 ---$) = focal length of the respective lens group
$d_i$ ($i=1, 2 ---$) = thickness of each lens element or airgap
$\nu_i$ ($i=1, 2 ---$) = Abbe's number of each lens element
$n_i$ ($i=1, 2 ---$) = refractive index of each lens element
$r_i$ ($i=1, 2 ---$) = radius of curvature of the respective surface of each lens element.

4 Claims, 11 Drawing Figures

PATENTED MAR 7 1972  3,647,281

(a) SPHERICAL ABERRATION (b) SINE CONDITION (c) ASTIGMATISM (d) DISTORTION

INVENTOR
YOSHITSUGI IKEDA
BY Kurt Kelman
AGENT

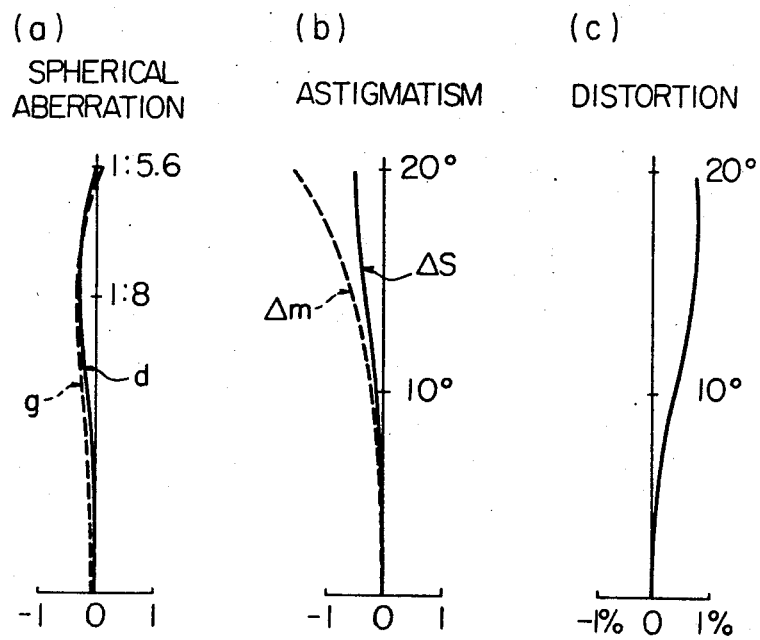
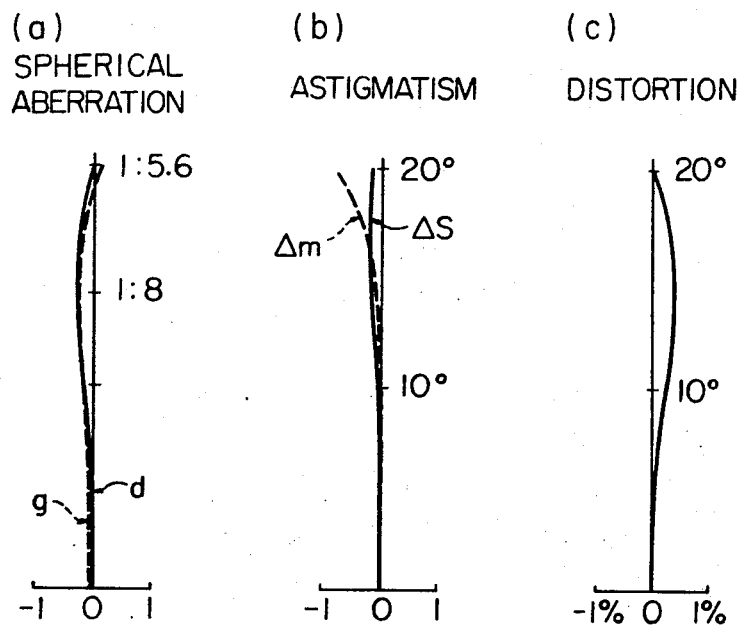

3,647,281

TELEPHOTOGRAPHIC OBJECTIVE HAVING SIX LENSES FORMING FOUR LENS GROUPS

BACKGROUND OF THE INVENTION

The present invention relates to a telephotographic objective, i.e., a telephoto lens having a wide angle of view, and more particularly, to a telephoto lens consisting of six lens elements forming four lens groups separated from each other by air gaps, respectively.

In a telephoto lens for use in a miniature photographic camera, the angle of field is in general small and, hence, the aberrations can be relatively easily compensated for, because it is only necessary to effect the compensation with respect to the small angle of field of the telephoto lens.

In a telephoto lens for use in a photographic camera loading therein photosensitive materials of large size, a wide angle of field is required for the telephoto lens and, at the same time, the telephoto ratio of the telephoto lens, i.e., the value $p=s'/f$, where $s'$=distance from the foremost point of the telephoto lens at the object side to the rear focal point and $f$=the focal length of the entire system, must be made as small as possible in comparison with 1. That is:

$$p=s'/f<<1$$

However, the compensation for the aberrations of a telephoto lens becomes more difficult as the telephoto ratio referred to above is made smaller and the size of the photosensitive materials is made greater.

The present invention aims at avoiding the above-described difficulties in a telephoto lens of the prior art.

SUMMARY OF THE INVENTION

An object of the present invention is to provide a novel and useful telephotographic objective, i.e., a telephoto lens having a wide angle of field such as 40° in which various aberrations are sufficiently compensated for while the telephoto ratio is kept sufficiently small.

Another object of the present invention is to provide a novel and useful telephoto lens of the type described above in which the aberrations appearing in a short-distance photography can be appropriately compensated for over the entire field of view by merely shifting the rearmost lens group with respect to the remaining lens groups of the telephoto lens.

The above objects of the present invention are achieved in accordance with the present invention by the provision of a telephoto lens comprising six lens elements forming first to fourth lens groups arranged in the order from the object side and separated from each other by airgaps, respectively and a diaphragm located between the second and third lens group, the first lens group being a positive meniscus lens element, each of the second and third lens groups being formed by a positive lens element and a negative lens element cemented to each other with the negative lens element located adjacent to the diaphragm so that they constitute a negative meniscus lens group, the fourth lens group being a positive meniscus lens element, all the concave surfaces of the first to third lens groups being directed to the diaphragm while the convex surface of the fourth lens group is directed to the diaphragm, the telephoto lens being characterized by satisfying the following relationships:

(I) $|0.7f_2|>f>-0.7f_3$
(II) $0.15f<d_5<0.35f$
(III) $(\nu_2-\nu_3)/(\nu_4-\nu_5)>0.5$
 $\nu_4-\nu_5>20$
(IV) (a) $(n_3-n_2)f/|r_4|<0.5, n_3>n_2$
 (b) $0.15f<-r_7<0.5f$
(V) $r_{10}>1.5r_9>0.5f$ where:
$f$ = the focal length of the entire system
$f_i$ = the focal length of each of the four lens groups ($i=1, 2,---4$, beginning at the first lens group)
$r_i$ = the radius of curvature of the surfaces of each of the lens elements ($i=1,2---10$, beginning at the foremost surface on the first lens group)
$d_i$ = the thickness of each of the lens elements or airgap between the adjacent two lens elements ($i=1, 2---9$, beginning at the first lens group)
$n_i$ = the refractive index of each of the lens elements as measured by using D-line of the spectrum ($i=1, 2---6$, beginning at the first lens group)
$\nu_i$ = the Abbe's number of each of the lens elements as measured by using D-line of the spectrum ($i=1, 2---6$ beginning at the first lens group)

The requirements (I) and (II) above are the basic requirements for forming a telephotographic objective or a telephoto lens. The requirement (I) defines the limits of the distribution or apportionment of the refractive power of the two lens groups between which the diaphragm is located, while the requirement (II) defines the limits for obtaining a wide angle of field in a telephoto lens. In other words, it is inadvantageous for the telephoto ratio $p$ and for the correction of the distortion if the airgap $d_5$ dividing the telephoto lens into the forward and the rearward lens group is made too small, while, on the other hand, it is made impossible to obtain sufficient quantity of light necessary for the wide angle of field although it is advantageous for the telephoto ratio $p$, if the above airgap $d_5$ is made too great.

The requirement (III) defined the limits for the material of the lens elements necessary for eliminating the chromatic aberration.

In a telephoto lens, not only the chromatic aberration due to the magnification is increased but also the compensation for the nonaxial lower oblique rays due to short wavelengths is made insufficient as the telephoto ratio is made small, and this tendency increases as the angle of field is made great. In the telephoto lens of the present invention, however, the chromatic aberration can be sufficiently compensated for over the entire wide angle of field by virtue of the selection of the materials of the lens elements according to the requirement (III) as well as the selection of the radius of curvature of the cemented surfaces provided in each of the second and third lens groups in accordance with the requirement (iV).

Further, the requirement (IV) serves to limit the astigmatism and the coma. In other words, it is made easy to compensate for the coma by selecting the refractive indices to be $n_3>n_2$, and, at the same time, the astigmatism generated by the cemented surfaces of the second lens group is kept sufficiently small so as to be adequately compensated for by the requirement (V) to be described below by making the absolute value $|r_4|$ of the radius of curvature of the cemented surfaces to be greater than $(n_3-n_2)f/0.05$ in consideration of the chromatic aberration due to magnification, and further, the radius of curvature $-r_7$ is selected to be $0.15f<-r_7<0.5f$ so that the coma and flare, particularly due to the color of shorter wavelengths, are appropriately prevented.

The reason why not only the compensation for the aberrations resulting from monochromatic light but also the compensation for the chromatic aberration are sufficiently taken into consideration in the requirement (IV) is to reduce the difficulties in the compensation for the chromatic aberration over the wide angle of field while the telephoto ratio $p$ described previously is kept sufficiently small.

The requirement (V) makes it possible to effect the compensations referred to above. The fourth lens group selected in accordance with the requirement (V) makes it possible to sufficiently compensate for the nonaxial aberrations, particularly the astigmatism which is left in the insufficiently corrected condition, without substantially affecting the chromatic aberration. By virtue of the requirement (V), the radii of curvature can be selected appropriately in accordance with the requirement (IV) with the possibility of the compensation for the chromatic aberration according to the requirement (V) being sufficiently taken into consideration.

Thus, in accordance with the present invention, a telephoto lens can be obtained in which the aberrations are sufficiently compensated for over the wide angle of field.

In accordance with another feature of the present invention, the deterioration in the nonaxial aberrations when the telephoto lens is used in the short-distance photograph is prevented by merely shifting rearwardly the fourth lens group with respect to the remaining lens groups without substantially affecting the axial aberrations.

In a telephoto lens designed for photographing an object located infinitely remote from the lens, the curvature of field is chiefly deteriorated in the short-distance photography, and this tendency increases as the angle of field is made greater.

In the present invention, the above disadvantages are sufficiently eliminated and a high-quality telephoto lens having a wide angle of field is provided.

BRIEF DESCRIPTION OF THE DRAWINGS

FIG. 3 shows various aberrations of the first example as set for the infinite-distance photography but used in the short-distance photography of 3 meters; and FIG. 4 shows various aberrations of the third example of the present invention in which the fourth lens group of the first example is shifted for the short-distance photography of 3 meters and used in the short-distance photography of 3 meters.

DETAILED DESCRIPTION OF THE PREFERRED EMBODIMENTS

Three examples of the present invention will be described below.

EXAMPLE 1

The data of the first example are shown in Table 1.

TABLE 1

| | Focal length | $f=100$ | |
| | Aperture | $F=1:5.6$ | |
| | Angle of field | $2w=40°$ | |
| $i$ | $r_i$ | $d_i$ | $n_i/\nu_i$ |
|---|---|---|---|
| 1 | 23.022 | 3.40 | 1.55963/61.2 |
| 2 | 51.646 | 0.20 | 1.53113/62.2 |
| 3 | 22.269 | 3.80 | 1.66446/35.8 |
| 4 | 729.95 | 1.26 | 1.52542/64.2 |
| 5 | 24.782 | 24.29 | 1.64769/33.8 |
| 6 | −12.760 | 1.29 | 1.51633/64.0 |
| 7 | −25.026 | 2.65 | |
| 8 | −21.471 | 0.22 | |
| 9 | 64.751 | 2.40 | |
| 10 | 171.558 | | |

Figure 1:
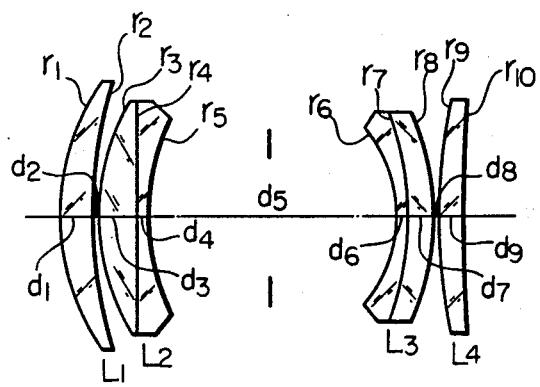
FIG. 1 is a longitudinal sectional view showing the telephoto lens constructed in accordance with the present invention.
Figure 2:
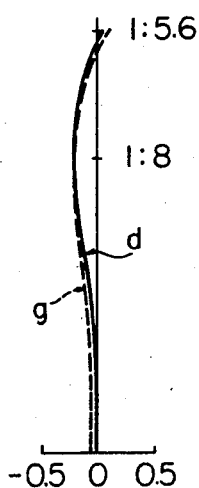
FIG. 2 shows various aberrations of the first example of the present invention as set for the infinite-distance photography and used in the infinite-distance photography.
Figure 2:
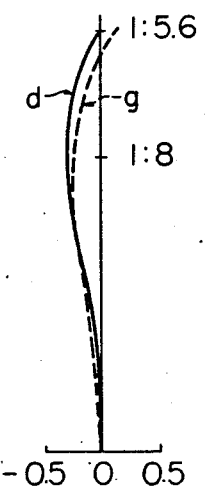
Figure 2:
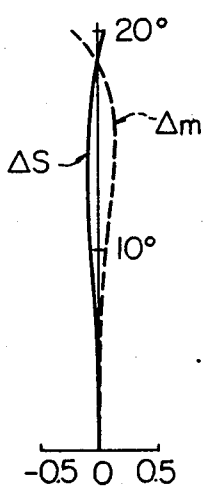
Figure 2:
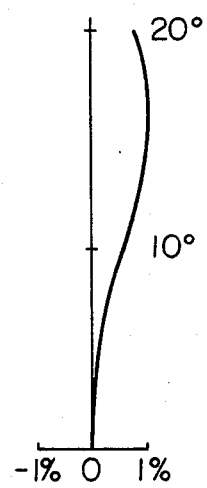

The aberrations of the first example used in the infinite-distance photography are shown in FIG. 2. The deterioration in the aberrations when used in the short-distance photography of 3 meters is shown in FIG. 3.

EXAMPLE 2

The data are shown in Table 2.

TABLE 2

| | Focal length | $f=100$ | |
| | Aperture | $F=1:5.6$ | |
| | Angle of field | $2w=38°$ | |
| $i$ | $r_i$ | $d_i$ | $n_i/\nu_i$ |
|---|---|---|---|
| 1 | 24.258 | 3.40 | 1.54771/62.9 |
| 2 | 37.978 | 0.20 | 1.56873/63.1 |
| 3 | 21.369 | 3.78 | 1.66446/35.8 |
| 4 | −765.56 | 1.23 | 1.48749/69.8 |
| 5 | 29.538 | 24.26 | 1.63980/34.4 |
| 6 | −12.590 | 1.01 | 1.51633/64.0 |
| 7 | −26.112 | 2.75 | |
| 8 | −23.117 | 0.19 | |
| 9 | 68.978 | 1.56 | |
| 10 | 235.537 | | |

EXAMPLE 3

The third example utilizes the lens groups of the first example described above but the fourth lens groups is shifted for the short-distance photography of 3 meters. The data are shown in Table 3.

TABLE 3

| | Magnification | $M=-0.094×$ | |
| | Angle of field $2w=40°$ | | |
| $i$ | $r_i$ | $d_i$ | $n_i/\nu_i$ |
|---|---|---|---|
| 1 | 23.022 | 3.40 | 1.55963/61.2 |
| 2 | 51.646 | 0.20 | 1.53113/62.2 |
| 3 | 22.269 | 3.80 | 1.66446/35.8 |
| 4 | 729.95 | 1.26 | 1.52542/64.2 |
| 5 | 24.782 | 24.29 | 1.64769/33.8 |
| 6 | −12.760 | 1.29 | 1.51633/64.0 |
| 7 | −25.026 | 2.65 | |
| 8 | −21.471 | 2.8 | |
| 9 | 64.751 | 2.40 | |
| 10 | 171.588 | | |

FIG. 4 shows the aberrations of the third example.

By comparing the aberrations shown in FIG. 4 with those shown in FIG. 3, it is apparent that the deterioration in the nonaxial aberrations in the short-distance photography is remarkably eliminated without affecting the axial aberrations in accordance with the present invention by merely shifting the fourth lens group appropriately.

I claim:

1. A telephoto lens having a wide angle of view and consisting of six lens elements forming first to fourth lens groups separated from each other by airgaps, respectively, the foremost first lens group at the object side being a positive meniscus lens element, the second lens group being a composite negative lens group consisting of a positive and a negative lens element arranged in the order from the object side and cemented with each other, the third lens group being a composite negative lens group consisting of a negative meniscus and a positive meniscus lens element arranged in the order from the object side and cemented with each other, the fourth lens group being a positive meniscus lens element, a diaphragm being provided between the second and the third lens group, all the air exposed concave surfaces of each of said first to third lens groups being directed to said diaphragm while the convex surface of said fourth lens is directed to said diaphragm wherein the aberrations such as the curvature of field can be compensated in the short-distance photography by shifting appropriately said fourth lens group.

2. Telephoto lens according to claim 1, satisfying the following data:

| | Focal length | $f=100$ | |
| | Aperture | $F=1:5.6$ | |
| | Angle of field | $2w=40°$ | |
| $i$ | $r_i$ | $d_i$ | $n_i/\nu_i$ |
|---|---|---|---|
| 1 | 23.022 | 3.40 | 1.55963/61.2 |
| 2 | 51.646 | 0.20 | 1.53113/62.2 |
| 3 | 22.269 | 3.80 | 1.66446/35.8 |
| 4 | 729.95 | 1.26 | 1.52542/64.2 |
| 5 | 24.782 | 24.29 | 1.64769/33.8 |
| 6 | −12.760 | 1.29 | 1.51633/64.0 |
| 7 | −25.026 | 2.65 | |
| 8 | −21.471 | 0.22 | |
| 9 | 64.751 | 2.40 | |
| 10 | 171.558 | | |

3. Telephoto lens according to claim 1, satisfying the following data:

| Focal length | $f=100$ |
| Aperture | $F=1:5.6$ |
| Angle of field | $2w=380$ |

| $i$ | $r_i$ | $d_i$ | $n_i/\nu_i$ |
|---|---|---|---|
| 1 | 24.258 | 3.40 | 1.54771/62.9 |
| 2 | 37.978 | 0.20 | 1.56873/63.1 |
| 3 | 21.369 | 3.78 | 1.66446/35.8 |
| 4 | −765.56 | 1.23 | 1.48749/69.8 |
| 5 | 29.538 | 24.26 | 1.63980/34.4 |
| 6 | −12.590 | 1.01 | 1.51633/64.0 |
| 7 | −26.112 | 2.75 | |
| 8 | −23.117 | 0.19 | |
| 9 | 68.978 | 1.56 | |
| 10 | 235.537 | | |

4. Telephoto lens according to claim 1, satisfying the following data:

| Magnification | $M=-0.094x$ | | |
|---|---|---|---|
| Angle of field | $2w=40°$ | | |
| $i$ | $r_i$ | $d_i$ | $n_i/\nu_i$ |
| 1 | 23.022 | 3.40 | 1.55963/61.2 |
| 2 | 51.646 | 0.20 | 1.53113/62.2 |
| 3 | 22.269 | 3.80 | 1.66446/35.8 |
| 4 | 729.95 | 1.26 | 1.52542/64.2 |
| 5 | 24.782 | 24.29 | 1.64769/33.8 |
| 6 | −12.760 | 1.29 | 1.51633/64.0 |
| 7 | −25.026 | 2.65 | |
| 8 | −21.471 | 2.8 | |
| 9 | 64.751 | 2.40 | |
| 10 | 171.558 | | |

\* \* \* \* \*